(12) United States Patent
Tokuno et al.

(10) Patent No.: US 11,933,316 B2
(45) Date of Patent: *Mar. 19, 2024

(54) BLOWER

(71) Applicant: Nidec Corporation, Kyoto (JP)

(72) Inventors: Yuta Tokuno, Kyoto (JP); Hideki Aoi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 18 days.

This patent is subject to a terminal disclaimer.

(21) Appl. No.: 17/546,143

(22) Filed: Dec. 9, 2021

(65) Prior Publication Data
US 2022/0099109 A1    Mar. 31, 2022

Related U.S. Application Data

(63) Continuation of application No. 16/689,185, filed on Nov. 20, 2019, now Pat. No. 11,286,953.

(30) Foreign Application Priority Data

Dec. 28, 2018  (JP) .................................. 2018-248649

(51) Int. Cl.
*F04D 29/52*    (2006.01)
*F04D 19/00*    (2006.01)
(Continued)

(52) U.S. Cl.
CPC ......... *F04D 29/522* (2013.01); *F04D 19/002* (2013.01); *F04D 25/0613* (2013.01);
(Continued)

(58) Field of Classification Search
CPC .............. F04D 19/002; F04D 25/0613; F04D 25/0646; F04D 25/082; F04D 29/4226;
(Continued)

(56) References Cited

U.S. PATENT DOCUMENTS 6,819,021 B1 * 11/2004 Horng ..................... H02K 5/00
                                                                310/90
7,775,767 B2 * 8/2010 Takemoto ............. F04D 29/542
                                                                415/211.2
(Continued)

OTHER PUBLICATIONS

Tokuno et al., "Blower", U.S. Appl. No. 16/689,185, filed Nov. 20, 2019.

*Primary Examiner* — Devon C Kramer
*Assistant Examiner* — Joseph S. Herrmann
(74) *Attorney, Agent, or Firm* — Keating & Bennett, LLP

(57) ABSTRACT

A blower includes a moving blade rotatable about a central axis, a motor to rotate the moving blade, a housing, and a substrate. The housing includes a holding portion below the moving blade to hold the motor, and a peripheral wall portion having a cylindrical shape extending upward from a radially outer end portion of the holding portion. The peripheral wall portion includes a peripheral wall recess recessed downward from an upper end of the peripheral wall portion and connecting a space radially inside and a space radially outside of the peripheral wall portion. The peripheral wall recess includes a first peripheral surface that opposes one circumferential direction opposite to a rotation direction of the moving blade, the first peripheral surface extending from an upper end of the peripheral wall recess toward a lower side of the peripheral wall portion.

11 Claims, 13 Drawing Sheets

(51) Int. Cl.
*F04D 25/06* (2006.01)
*F04D 25/08* (2006.01)
*F04D 29/42* (2006.01)
*F04D 29/58* (2006.01)
*F04D 29/66* (2006.01)
*F04D 29/70* (2006.01)
*H02K 5/04* (2006.01)
*H02K 5/20* (2006.01)
*H02K 5/24* (2006.01)
*H02K 7/14* (2006.01)
*H02K 9/06* (2006.01)

(52) U.S. Cl.
CPC ....... *F04D 25/082* (2013.01); *F04D 29/4253* (2013.01); *F04D 29/5813* (2013.01); *F04D 29/667* (2013.01); *F04D 29/70* (2013.01); *H02K 5/04* (2013.01); *H02K 5/203* (2021.01); *H02K 5/24* (2013.01); *H02K 7/14* (2013.01); *H02K 9/06* (2013.01)

(58) Field of Classification Search
CPC ............... F04D 29/4253; F04D 29/522; F04D 29/5813; F04D 29/70; F04D 29/666; F04D 29/667; F04D 29/5806; H02K 5/04; H02K 5/24; H02K 7/14; H02K 9/06
See application file for complete search history.

(56) References Cited

U.S. PATENT DOCUMENTS

| | | | |
|---|---|---|---|
| 8,172,553 B2* | 5/2012 | Horng | F04D 25/0633 |
| | | | 310/68 R |
| 9,388,824 B2* | 7/2016 | Yin | F04D 25/0646 |
| 11,286,953 B2* | 3/2022 | Tokuno | H02K 11/33 |
| 2007/0252451 A1* | 11/2007 | Shibuya | H02K 9/227 |
| | | | 310/67 R |

* cited by examiner

BLOWER

CROSS REFERENCE TO RELATED APPLICATION

This is a continuation of U.S. application Ser. No. 16/689,185, filed on Nov. 20, 2019, which claims priority under 35 U.S.C. § 119 to Japanese Application No. 2018-248649, filed on Dec. 28, 2018, the entire contents of which are hereby incorporated herein by reference.

1. FIELD OF THE INVENTION

The present disclosure relates to a blower.

2. BACKGROUND

There has heretofore been known a blower that blows air with a motor rotating moving blades. In order to rotate the moving blades at a higher speed and increase the amount of air blown from the blower, it is required to increase a drive current of the motor, which, however, leads to temperature rises in electronic components mounted on a substrate, a coil of a stator, and the like in the motor. In view of this, a technique has been proposed to cool the electronic components, the coil, and the like in the motor by flowing air into the motor.

For example, a conventional motor fan generates negative pressure in a gap between a stator frame and a rotor frame by the rotation of a fan blade. Thus, air flows into the motor through an air inflow passage provided in a bottom wall portion of the rotor frame. In order to change the width dimension of the gap where the negative pressure is generated, a recess is formed at the end of a peripheral wall portion of the stator frame of the motor.

When the recess is formed in the peripheral wall portion, a portion of the airflow that is sent out by the rotation of the moving blade and flows radially outward of the peripheral wall portion hits the inner surface of the recess and flows into the peripheral wall portion through the recess due to a pressure difference between the inside and outside of the recess. In this event, there is a possibility that noise may be generated in the recess due to turbulence of the airflow near the inner surface of the recess.

SUMMARY

An example embodiment of a blower of the present disclosure includes a moving blade rotatable about a central axis extending in a vertical direction, a motor to rotate the moving blade, a housing surrounding the moving blade and the motor, and a substrate. The housing includes a holding portion below the moving blade to hold the motor, and a peripheral wall portion having a cylindrical shape centered on the central axis and extending upward from a radially outer end portion of the holding portion. The peripheral wall portion includes a peripheral wall recess recessed downward from an upper end of the peripheral wall portion and connecting a space radially inside of the peripheral wall portion and a space radially outside of the peripheral wall portion. The peripheral wall recess includes a first peripheral surface that opposes one circumferential direction that is opposite to a rotation direction of the moving blade, the first peripheral surface extending in the one circumferential direction from an upper end of the peripheral wall recess toward a lower side of the peripheral wall portion. The substrate is radially inside of the peripheral wall portion. The substrate opposes the peripheral wall recess in the radial direction.

The above and other elements, features, steps, characteristics and advantages of the present disclosure will become more apparent from the following detailed description of the example embodiments with reference to the attached drawings.

DETAILED DESCRIPTION

Figure 1A:
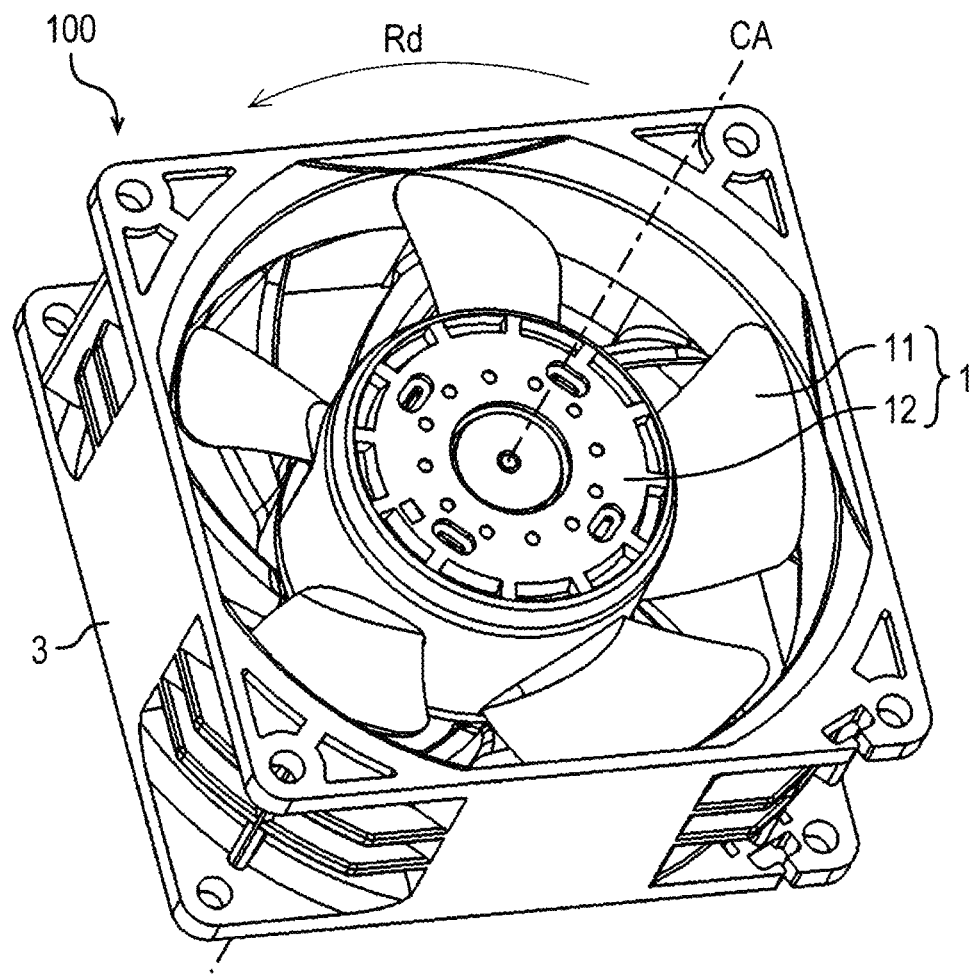
FIG. 1A is a perspective view of a blower according to an example embodiment of the present disclosure.

Example embodiments of the present disclosure will be described below with reference to the drawings.

In the present description, as for a blower 100, a direction parallel or substantially parallel to a central axis CA is referred to as an "axial direction". As for the axial directions, a direction from a stationary blade 32 to a moving blade 11 to be described later is referred to as "upward", while a direction from the moving blade 11 to the stationary blade 32 is referred to as "downward". In each component, an end portion on the upper side is referred to as an "upper end portion", while the position of the upper end portion in the axial direction is referred to as an "upper end". An end portion on the lower side is referred to as a "lower end portion", while the position of the lower end portion in the axial direction is referred to as a "lower end". On the surface of each component, a surface facing upward is referred to as an "upper surface", while a surface facing downward is referred to as a "lower surface".

A direction orthogonal or substantially orthogonal to the central axis CA is referred to as a "radial direction". As for the radial directions, a direction approaching the central axis CA is referred to as "radially inward", while a direction heading away from the central axis CA is referred to as "radially outward". In each component, an end portion on the inner side in the radial direction is referred to as a "radially inner end portion", and the position of the radially inner end portion in the radial direction is referred to as a "radially inner end". On the other hand, an end portion on the outer side in the radial direction is referred to as a "radially outer end portion", and the position of the radially outer end portion in the radial direction is referred to as a "radially outer end". As for side surfaces of each component, a side surface facing inward in the radial direction is referred to as a "radially inner side surface", while a side surface facing outward in the radial direction is referred to as a "radially outer side surface".

A direction in which the moving blade 11 rotates about the central axis CA is referred to as a "circumferential direction". As for the circumferential direction, a direction in which the moving blade 11 rotates about the central axis CA is referred to as a "rotation direction Rd", while a direction opposite to the rotation direction Rd is referred to as "one circumferential direction Rb". The rotation direction Rd may be referred to as "the other circumferential direction". In each component, an end portion in the circumferential direction is referred to as a "circumferential end portion", and the position of the circumferential end portion in the circumferential direction is referred to as a "circumferential end". An end portion in one circumferential direction Rb is referred to as "one circumferential end portion", and the position of one circumferential end portion in the circumferential direction is referred to as "one circumferential end". An end portion in the other circumferential direction Rd is referred to as "the other circumferential end portion", and the position of the other circumferential end portion in the circumferential direction is referred to as "the other circumferential end". As for the side surfaces of each component, a surface facing in the circumferential direction is referred to as a "circumferential side surface". A side surface facing one circumferential direction Rb is referred to as "one circumferential side surface", while a side surface facing the other circumferential direction Rd is referred to as "the other circumferential side surface".

In this specification, "annular" means not only a ring shape that is continuous around an entire circumference in the circumferential direction about the central axis CA, but also an arc shape which is discontinuous or includes a cut in a portion of the entire circumference about the central axis CA.

The names of directions, parts, positions, and surfaces described above and the definition of "annular" described above are definitions of names and shape for use in the description of this specification, and are not intended to limit any names and shapes when incorporated into actual devices.

In this specification, as for positional relationships between any one of azimuth, line, and surface and any other, "parallel" means not only a state where the two do not intersect at all no matter how much further the two extend, but also a state where the two are substantially parallel to each other. "Vertical" and "orthogonal" include not only the state in which they intersect each other at 90 degrees, but also the state in which they are substantially perpendicular and the state in which they are substantially orthogonal. That is, "parallel", "vertical", and "orthogonal" each include a state where a positional relationship therebetween may have a shift in angle that does not depart from the gist of the present disclosure.

When any one of azimuth, line, and surface intersects with any other and the angle made by the both is not 90 degrees, such a state is expressed as that the both intersect at an acute angle. This expression is synonymous with the fact that the both intersect at an obtuse angle, not to mention from a geometric point of view.

Figure 1B:
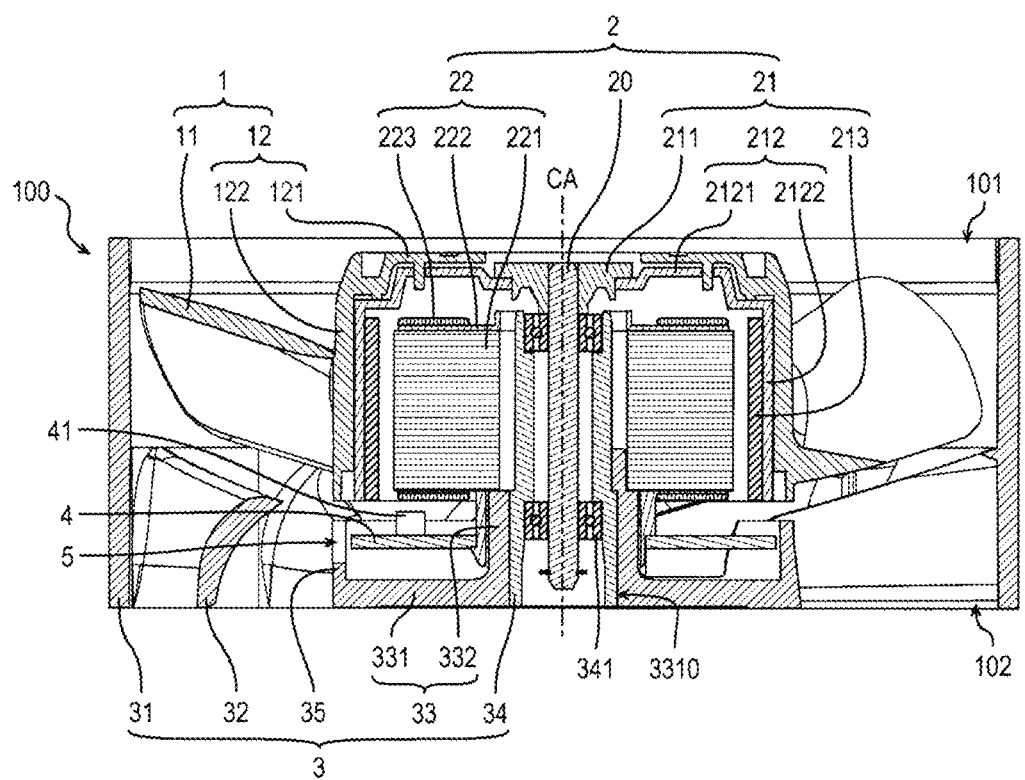
FIG. 1B is a cross-sectional view of a blower according to an example embodiment of the present disclosure.

FIG. 1A is a perspective view showing a blower 100 according to an example embodiment of the present disclosure. FIG. 1B is a cross-sectional view showing the blower 100 according to the example embodiment. FIG. 1B shows a cross-sectional structure when the blower 100 is virtually cut along a flat surface including a central axis CA.

The blower 100 according to the example embodiment is an axial fan, which sends out air sucked from an intake port 101 downward from an exhaust port 102. As shown in FIGS. 1A and 1B, the blower 100 preferably includes an impeller 1, a motor 2, a housing 3, and a substrate 4.

The impeller 1 is attached to a rotor 21 (to be described later) of the motor 2. The impeller 1 preferably includes a moving blade 11 and a covered cylindrical impeller base 12.

The moving blade 11 is provided on the impeller base 12. The moving blade 11 is rotatable about the central axis CA extending in a vertical direction. The blower 100 includes the moving blade 11. The impeller base 12 includes a base lid portion 121 and a base cylindrical portion 122. The base lid portion 121 is annular and extends radially outward from a shaft holder 211 of the rotor 21 (to be described later) of the motor 2. The base cylindrical portion 122 extends downward from a radially outer end portion of the base lid portion 121.

The moving blade 11 is provided on the radially outer side surface of the base cylindrical portion 122. More specifically, in the radial direction, the moving blade 11 preferably extends from the radially outer side surface of the base cylindrical portion 122 toward the radially outer side. The moving blade 11 may be a portion of the rotor 21 without being limited to the specific arrangement shown in of this example embodiment. In this case, the moving blade 11 may be provided, for example, on the radially outer side surface of a holder 212 (to be described later) of the rotor 21.

In the axial direction, the moving blade 11 extends in the rotation direction Rd toward the upper side. The moving blade 11 is rotated in the rotation direction Rd about the central axis CA by driving the motor 2 to send an airflow. The airflow swirls in the rotation direction Rd about the central axis CA and flows downward.

Figure 2:
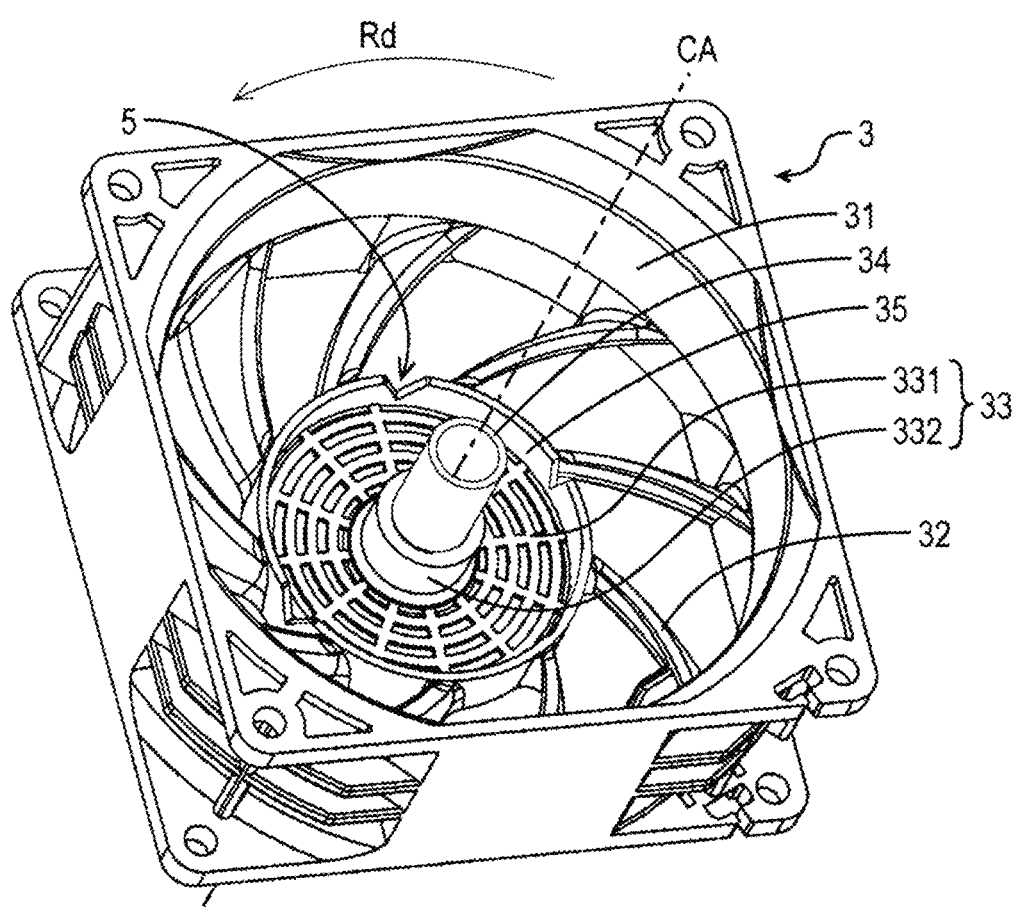
FIG. 2 is a perspective view of a housing according to an example embodiment of the present disclosure.

The motor 2 rotates the moving blade 11. As described above, the blower 100 includes the motor 2. As shown in FIG. 2, the motor 2 includes a shaft 20, the rotor 21, and a stator 22.

The shaft 20 is the rotation axis of the rotor 21, which supports the rotor 21 and is rotatable with the rotor 21 about the central axis CA. The shaft 20 is not limited to the specific arrangement of this example embodiment, and may be a fixed shaft attached to the stator 22, for example. When the shaft 20 is a fixed shaft, a bearing (not shown) is provided between the rotor 21 and the shaft 20.

The rotor 21 is rotatable with the moving blade 11 about the central axis CA. The rotor 21 includes the shaft holder 211, the covered cylindrical holder 212, and a magnet 213.

The shaft holder 211 is annular and attached to the upper end portion of the shaft 20. The shaft holder 211 preferably has its radially inner end portion fixed to the radially outer side surface of the shaft 20. The holder 212 includes a rotor lid portion 2121 and a rotor cylindrical portion 2122. The rotor lid portion 2121 is annular and extends radially outward from the shaft holder 211. The rotor cylindrical portion 2122 extends downward from the radially outer end portion of the rotor lid portion 2121. The impeller base 12 is attached to the holder 212. The rotor lid portion 2121 is connected to the base lid portion 121. The radially outer side surface of the rotor cylindrical portion 2122 is connected to the radially inner side surface of the base cylindrical portion 122. The magnet 213 is held on the radially inner side surface of the rotor cylindrical portion 2122. The magnet 213 is on the radially outer side of the stator 22 and opposes the radially outer side surface of the stator 22 with a gap in the radial direction.

The stator 22 has an annular shape centered on the central axis CA. The stator 22 rotates the rotor 21 when the motor 2 is driven. The stator 22 preferably includes a stator core 221, an insulator 222, and a coil 223. The stator core 221 is a magnetic body having an annular shape centered on the central axis CA, and is preferably defined by a laminated body including a plurality of electromagnetic steel plates laminated upon one another in this example embodiment. The stator core 221 preferably has its radially inner end portion fixed to the radially outer side surface of a bearing holder 34 (to be described later) of the housing 3. The radially outer side surface of the stator core 221 opposes the magnet 213 in the radial direction with a gap therebetween. The insulator 222 is an electrical insulator using a resin material or the like, and covers at least a part of the stator core 221. The coil 223 is preferably a winding defined by a conducting wire wound around the stator core 221 with the insulator 222 interposed therebetween.

Next, the housing 3 will be described with reference to FIGS. 1A to 2. FIG. 2 is a perspective view of the housing 3.

The housing 3 surrounds the moving blade 11 and the motor 2. As described above, the blower 100 includes the housing 3. The housing 3 preferably includes a housing cylindrical portion 31, a plurality of stationary blades 32, a holding portion 33, a cylindrical bearing holder 34, and a peripheral wall portion 35.

The housing cylindrical portion 31 extends in the axial direction. The intake port 101 is preferably provided at the upper end portion of the housing cylindrical portion 31. The exhaust port 102 is preferably provided at the lower end portion of the housing cylindrical portion 31. The housing cylindrical portion 31 houses therein the impeller 1, the motor 2, the stationary blade 32, the holding portion 33, and the peripheral wall portion 35.

The stationary blade 32 extends radially outward from the holding portion 33 and is connected to the housing cylindrical portion 31. In other words, the stationary blade 32 has its radially inner end portion connected to the radially outer side surface of the holding portion 33. The stationary blade 32 has its radially outer end portion connected to the radially inner side surface of the housing cylindrical portion 31. In the axial direction, the stationary blade 32 is below the moving blade 11 and extends in the rotation direction Rd of the moving blade 11 toward the lower side. The stationary blade 32 is tilted in the opposite direction to the moving blade 11 as viewed from the radial direction.

The holding portion 33 is provided below the moving blade and holds the motor 2. As described above, the housing 3 includes the holding portion 33. The holding portion 33 is supported by the housing cylindrical portion 31 through the stationary blade 32. The holding portion 33 includes a bracket 331 and a holding cylindrical portion 332. The bracket 331 preferably has an annular shape surrounding the central axis CA, and is below the impeller 1 and the motor 2. The radially inner end portion of the stationary blade 32 is connected to the radially outer side surface of the bracket 331. The holding cylindrical portion 332 preferably has a cylindrical shape extending in the axial direction, and extends upward from the radially inner end portion of the bracket 331. A center hole 3310 is provided at the center of the bracket 331. The center hole 3310 passes through the bracket 331 in the axial direction and communicates with the inside of the holding cylindrical portion 332. The bearing holder 34 is inserted into the center hole 3310 and the holding cylindrical portion 332. The bearing holder 34 has its lower end portion connected to the radially inner side surface of the center hole 3310 and the radially inner side surface of the holding cylindrical portion 332.

The bearing holder 34 has a cylindrical shape extending in the axial direction, and is supported by the bracket 331 and the holding cylindrical portion 332. The bearing holder 34 holds the stator 22. The stator core 221 is fixed to the radially outer side surface of the bearing holder 34. The shaft 20 is inserted into the bearing holder 34. A bearing 341 is provided on the radially inner side surface of the bearing holder 34. The bearing holder 34 rotatably supports the shaft 20 via the bearing 341. The bearing 341 is preferably a ball bearing in this example embodiment, but is not limited to this example and may be a sleeve bearing, for example.

The peripheral wall portion 35 has a cylindrical shape centered on the central axis CA, and extends upward from the radially outer end portion of the holding portion 33. As described above, the housing 3 includes the peripheral wall portion 35. The peripheral wall portion 35 includes a peripheral wall recess 5. The peripheral wall recess 5 is recessed downward from the upper end portion of the peripheral wall portion 35. The peripheral wall recess 5 also connects a space radially inside of the peripheral wall portion 35 and a space radially outside of the peripheral wall portion 35. The peripheral wall recess 5 is preferably a so-called notch provided in the upper end portion of the peripheral wall portion 35 in this example embodiment.

A plurality of peripheral wall recesses 5 are preferably provided in the circumferential direction. In this example embodiment, as shown in FIG. 2, intervals between the peripheral wall recesses 5 adjacent to each other in the circumferential direction are preferably different. By providing the peripheral wall recesses 5 unevenly in the circumferential direction, the phase of a sound generated in each peripheral wall recess 5 is shifted when the moving blade 11 passes through each peripheral wall recess 5 in the rotation direction Rd. Therefore, it is possible to reduce a pulsed noise generated by these sounds overlapping each other due to the providing of the peripheral wall recesses 5 unevenly in the circumferential direction. However, the present disclosure is not limited to this example, and the peripheral wall recesses 5 may be evenly arranged in the circumferential direction. That is, the intervals between the peripheral wall recesses 5 adjacent to each other in the circumferential direction may be the same.

Next, the substrate 4 is electrically connected to the end portion of the conducting wire of the coil 223 and to a connection wire (not shown) drawn out of the housing 3. In the axial direction, the substrate 4 is below the motor 2 and the impeller 1 except for the lower portion of the insulator 222, and is above the bracket 331 of the housing 3. In the radial direction, the substrate 4 is radially inside of the peripheral wall portion of the housing 3 and is radially outside of the holding cylindrical portion 332 and the bearing holder 34 of the housing 3.

The substrate 4 includes an electronic component 41. As described above, the blower 100 includes the substrate 4. The electronic component 41 is radially inside of the peripheral wall portion 35. The electronic component 41 is above the bracket 331. Since the electronic component 41 opposes the peripheral wall recess 5 in the radial direction, the airflow flowing into the space radially inside of the peripheral wall portion 35 through the peripheral wall recess 5 is likely to hit the electronic component 41. Therefore, the electronic component 41 can be cooled with the airflow.

Figure 3A:
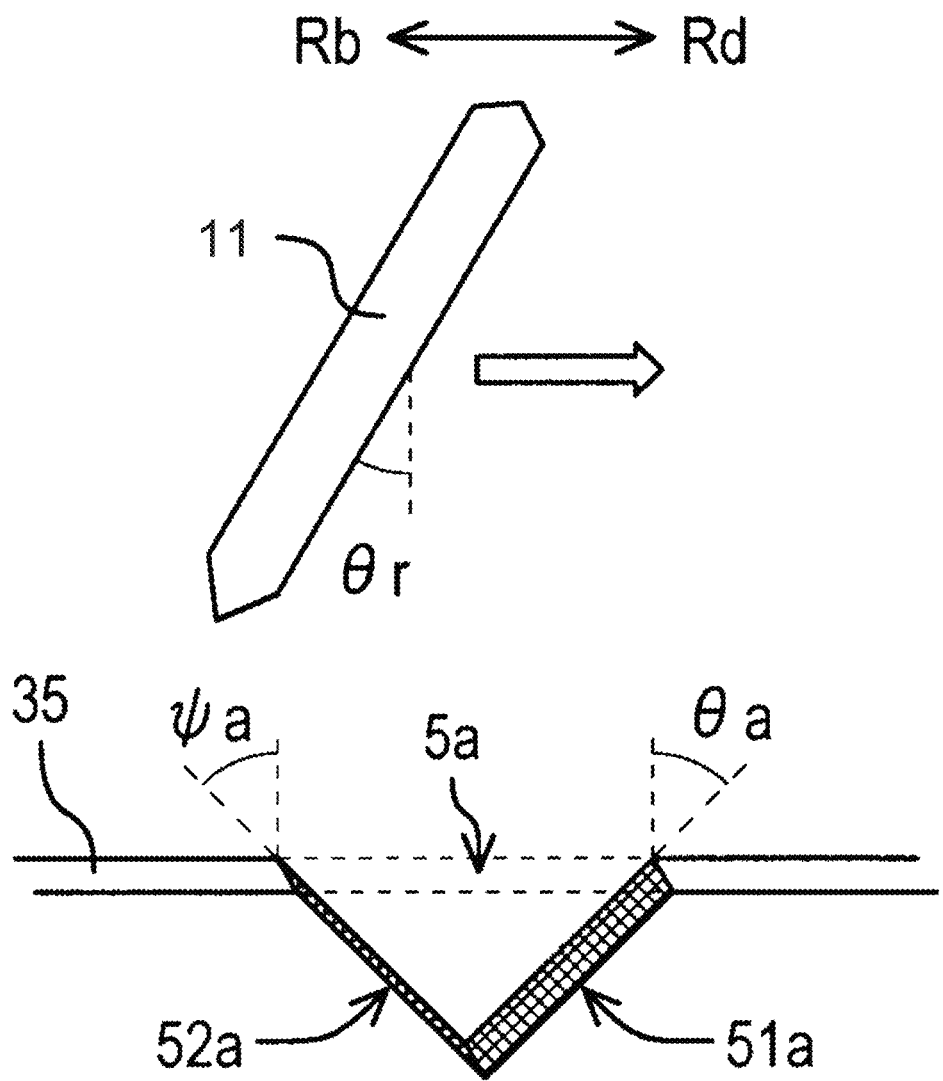
FIG. 3A is a perspective view showing a peripheral wall recess according to a first example of an example embodiment of the present disclosure.
Figure 3B:
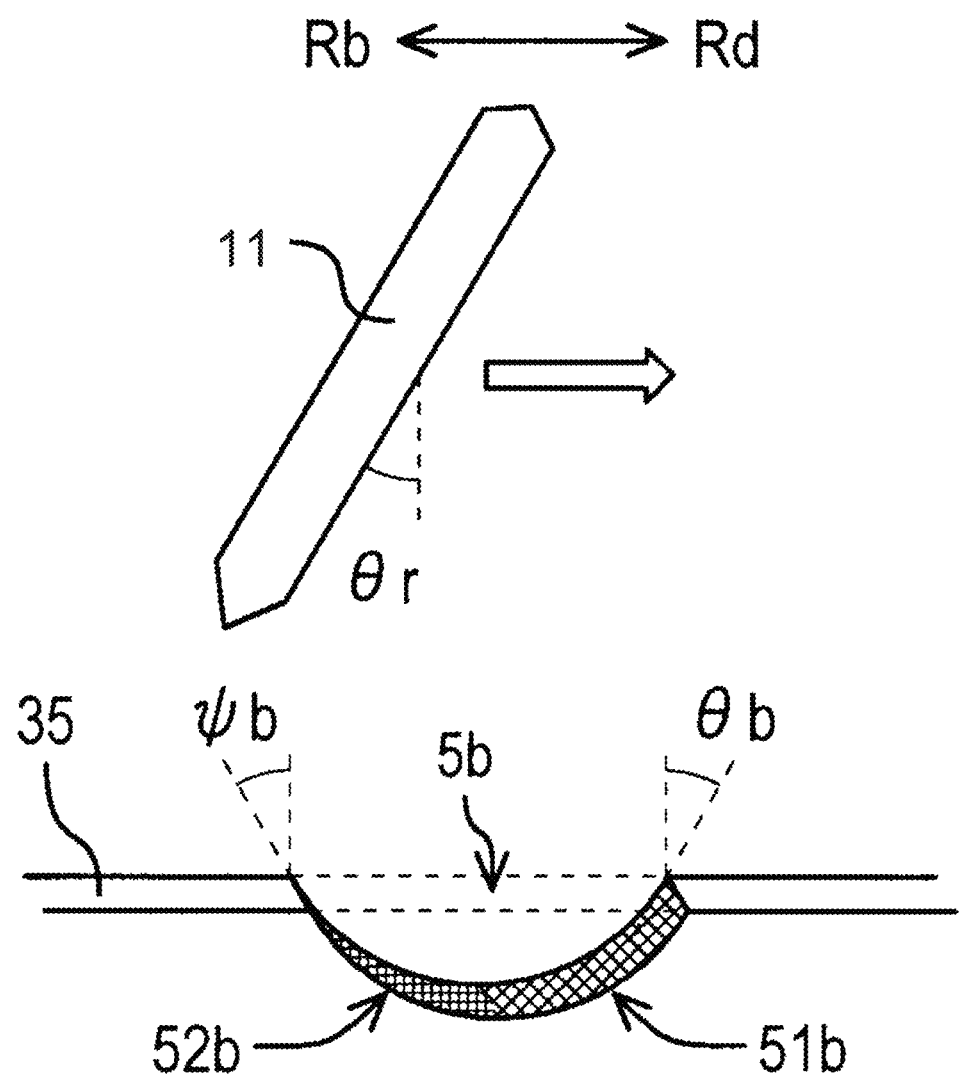
FIG. 3B is a perspective view showing a peripheral wall recess according to a second example of an example embodiment of the present disclosure.

Next, a configuration of the peripheral wall recess 5 will be described. FIG. 3A is a perspective view showing a peripheral wall recess 5a according to a first example embodiment of the present disclosure. FIG. 3B is a perspective view showing a peripheral wall recess 5b according to a second example embodiment of the present disclosure. In FIGS. 3A and 3B, the moving blade 11 and the peripheral wall recesses 5a and 5b are viewed from the radial direction and from above.

As shown in FIGS. 3A and 3B, the peripheral wall recesses 5a and 5b according to the first and second example embodiments include first peripheral surfaces 51a and 51b. The first peripheral surfaces 51a and 51b are each one circumferential side surface facing one circumferential direction Rb that is opposite to the rotation direction Rd of the moving blade 11. The first peripheral surfaces 51a and 51b extend in one circumferential direction Rb toward the lower side from the upper ends of the peripheral wall recesses 5a and 5b.

The first peripheral surfaces 51a and 51b of the peripheral wall recesses 5a and 5b face in the opposite direction to the rotation direction Rd of the moving blade 11, and extend in the opposite direction toward the lower side from the upper ends of the peripheral wall recesses 5a and 5b; therefore, airflows hitting against the first peripheral surfaces 51a and 51b are likely to flow smoothly along the first peripheral surfaces 51a and 51b. Therefore, airflow turbulence can be suppressed or minimized around the first peripheral surfaces 51a and 51b. Therefore, it is possible to suppress or minimize the generation of noise due to the airflow flowing into the peripheral wall recesses 5a and 5b.

Molding of the housing 3 using a mold is facilitated. For example, the first peripheral surfaces 51a and 51b of the peripheral wall recesses 5a and 5b can be formed by removing the mold up and down during molding without having to use a mold with a complicated structure.

As shown in FIGS. 3A and 3B, the peripheral wall recesses 5a and 5b further include second peripheral surfaces 52a and 52b. The second peripheral surfaces 52a and 52b are the other circumferential side surfaces facing the other circumferential direction Rd, which is the same direction as the rotation direction Rd of the moving blade 11. The second peripheral surfaces 52a and 52b extend from one circumferential direction Rb to the other circumferential direction Rd toward the lower side from the upper ends of the peripheral wall recesses 5a and 5b.

The second peripheral surfaces 52a and 52b of the peripheral wall recesses 5a and 5b face the rotation direction Rd of the moving blade 11, and extend in the rotation direction Rd toward the lower side from the upper ends of the peripheral wall recesses 5a and 5b, thus making it likely for airflows flowing radially inward through the peripheral wall recesses 5a and 5b in the vicinity of the second peripheral surfaces 52a and 52b to flow smoothly along the second peripheral surfaces 52a and 52b. Therefore, airflow turbulence around the second peripheral surfaces 52a and 52b can be suppressed or minimized. Therefore, it is possible to suppress or minimize the generation of noise due to the airflow flowing into the peripheral wall recesses 5a and 5b.

Molding of the housing 3 using a mold is facilitated. For example, the second peripheral surfaces 52a and 52b of the peripheral wall recesses 5a and 5b can be formed by removing the mold up and down during molding without having to use a mold with a complicated structure.

In the first and second example embodiments, the first peripheral surfaces 51a and 51b are each an example of the "first peripheral surface" of the present disclosure. The second peripheral surfaces 52a and 52b are each an example of the "second peripheral surface" of the present disclosure.

As shown in FIG. 3A, in the first example embodiment of the present disclosure, the first and second peripheral surfaces 51a and 52a are flat surfaces tilted in opposite directions in the circumferential direction. The first peripheral surface 51a has its lower end portion connected to the lower end portion of the second peripheral surface 52a. That is, the peripheral wall recess 5a according to the first example embodiment is preferably a so-called V-shaped notch.

As shown in FIG. 3A, the tilt direction of the first peripheral surface 51a is a direction perpendicular to the normal and radial directions of the first peripheral surface 51a. An acute angle θa made by the tilt direction of the first peripheral surface 51a with the axial direction is preferably greater than the acute angle θr made by the moving blade 11 with the axial direction. The acute angle θa of the first peripheral surface 51a is the tilt angle of the first peripheral surface 51a with respect to the axial direction. The acute angle θr of the moving blade 11 is a so-called lead angle. As viewed from the radial direction, the acute angle θr is an acute angle made by an imaginary line with the axial direction, the imaginary line connecting the upper end of the radially inner end portion of a positive pressure surface of the moving blade 11 to the lower end of the radially outer end portion of the positive pressure surface of the moving blade 11. Since the acute angle θa of the first peripheral surface 51a is greater than the acute angle θr of the moving blade 11, the airflow hitting against the first peripheral surface 51a is likely to flow more smoothly along the first peripheral surface 51a. Therefore, the generation of noise caused by the airflow flowing into the peripheral wall recess 5a can be further suppressed or minimized. However, the present disclosure is not limited to this example, and θa≤θr may be satisfied if so desired.

In other words, in FIG. 3A, the first peripheral surface 51a extends from one circumferential direction Rb to the other circumferential direction Rd toward the upper side from the lower end of the peripheral wall recess 5a. In the first example embodiment, the first peripheral surface 51a is a flat surface tilted in the other circumferential direction Rd toward the upper side. Since the first peripheral surface 51a is the flat surface as described above, an opening area of the peripheral wall recess 5a as viewed from the radial direction can be increased while increasing the acute angle θa of the first peripheral surface 51a. Accordingly, more airflows can be flowed radially inside of the peripheral wall portion 35 through the peripheral wall recess 5a, and the stator 22 of the motor 2, the electronic component 41 mounted on the substrate 4, and the like can be cooled by the airflows.

In other words, in FIG. 3A, the second peripheral surface 52a extends from the lower end of the peripheral wall recess 5a. In the first example embodiment, the second peripheral surface 52a is a flat surface tilted in one circumferential direction Rb toward the upper side. Since the second peripheral surface 52a is the flat surface as described above, an opening area in the circumferential direction of the peripheral wall recess 5a as viewed from the radial direction can be increased while increasing the acute angle φa of the second peripheral surface 52a. Accordingly, more airflows can be flowed radially inside of the peripheral wall portion 35 through the peripheral wall recess 5a, and the stator 22 of the motor 2, the electronic component 41 mounted on the substrate 4, and the like can be cooled by the airflows.

As shown in FIG. 3B, the peripheral wall recess 5b according to the second example embodiment of the present disclosure is an arc-shaped notch as viewed from the radial direction. The arc shape may be, for example, a semicircular shape, but is preferably an arc shape having a central angle of less than 180 degrees or about 180 degrees. The first and second peripheral surfaces 51b and 52b each have an arc shape when viewed from the radial direction, and are curved in opposite directions in the circumferential direction.

The lower end portion of the first peripheral surface 51b is preferably smoothly connected to the lower end portion of the second peripheral surface 52b. That is, the tangent line to the first peripheral surface 51b at the lower end of the first peripheral surface 51b is preferably substantially parallel to the tangent line to the second peripheral surface 52b at the lower end of the second peripheral surface 52b.

As shown in FIG. 3B, in the entire first peripheral surface 51b, the tilt direction of the first peripheral surface 51b is perpendicular to the normal and radial directions of the first peripheral surface 51b. The acute angle made by the tilt direction of the first peripheral surface 51b with the axial direction is preferably greater than the acute angle θr made by the moving blade 11 with the axial direction. The tilt direction of the first peripheral surface 51b is an extending direction of the tangent line to the first peripheral surface 51b at each point on the first peripheral surface 51b. The acute angle made by the tilt direction of the first peripheral surface 51b with the axial direction is a tilt angle of the tangent line with respect to the axial direction in the entire first peripheral surface 51b, and includes the acute angle θb at the upper end of the first peripheral surface 51b. The acute angle θr of the moving blade 11 is a so-called lead angle as described above. Since the acute angle in the entire first peripheral surface 51b is greater than the acute angle θr of the moving blade 11, the airflow hitting against the first peripheral surface 51b is likely to flow more smoothly along the first peripheral surface 51b. Therefore, the generation of noise due to the airflow flowing into the peripheral wall recess 5b can be further suppressed or minimized. However, the present disclosure is not limited to this example, and, in at least a portion of the first peripheral surface 51b, the acute angle made by the tilt direction of the first peripheral surface 51b with the axial direction may be equal to or smaller than the acute angle θr of the moving blade 11.

In other words, the first peripheral surface 51b extends from one circumferential direction Rb to the other circumferential direction Rd toward the upper side from the lower end of the peripheral wall recess 5b. As shown in FIG. 3B, the first peripheral surface 51b is preferably a curved surface that is curved downward as viewed from the radial direction and in the other circumferential direction Rd. Since the first peripheral surface 51b is the curved surface as described above, it is made easier to increase the acute angle θb made by the direction perpendicular to the normal and radial directions of the first peripheral surface 51b with the axial direction in the entire first peripheral surface 51b. Accordingly, since the airflow hitting against the first peripheral surface 51b easily flows smoothly along the first peripheral surface 51b, the generation of noise can be suppressed or minimized. However, the present disclosure is not limited to the example shown in FIG. 3B, but the first peripheral surface 51b may be a curved surface that is curved upward as viewed from the radial direction and in one circumferential direction Rb.

In other words, the second peripheral surface 52b extends from the lower end of the peripheral wall recess 5b. The second peripheral surface 52b is preferably a curved surface that is curved downward as viewed from the radial direction and from the other circumferential direction Rd to one circumferential direction Rb. Since the second peripheral surface 52b is the curved surface as described above, it is made easier to increase the acute angle made by the direction perpendicular to the normal and radial directions of the second peripheral surface 52b with the axial direction in the entire second peripheral surface 52b. Therefore, since the airflow easily flows smoothly along the second peripheral surface 52b, the generation of noise can be suppressed or minimized. However, the present disclosure is not limited to this example, but the second peripheral surface 52b may be a curved surface that is curved upward as viewed from the radial direction and from one circumferential direction Rb to the other circumferential direction Rd.

In the second example embodiment of the present disclosure, the tilt direction of the second peripheral surface 52b is an extending direction of the tangent line to the second peripheral surface 52b at each point on the second peripheral surface 52b. The acute angle made by the tilt direction of the second peripheral surface 52b with the axial direction is a tilt angle of the tangent line with respect to the axial direction in the entire second peripheral surface 52b, and includes an acute angle φb at the upper end of the second peripheral surface 52b.

Figure 4A:
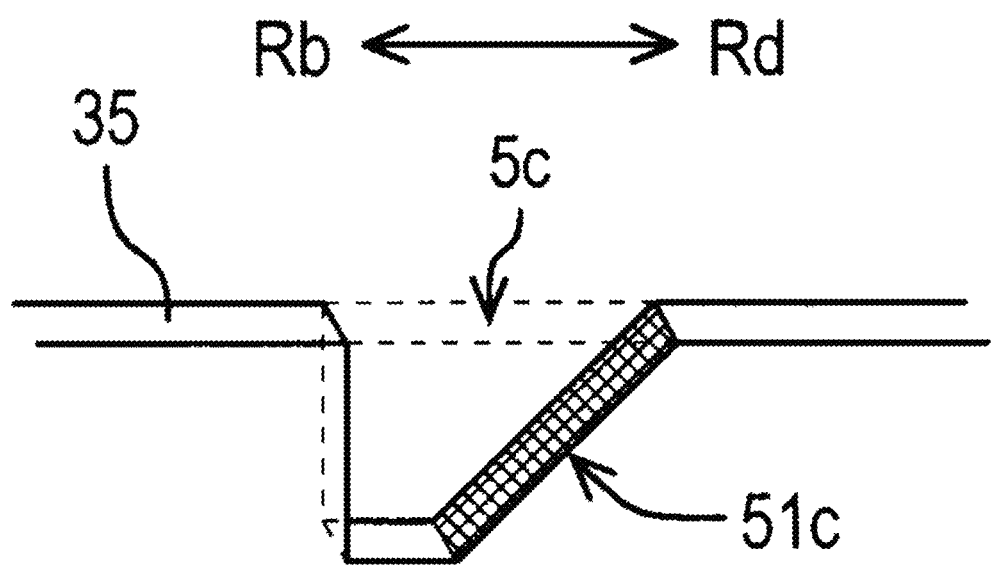
FIG. 4A is a perspective view showing a peripheral wall recess according to another configuration of the first example of an example embodiment of the present disclosure.
Figure 4B:
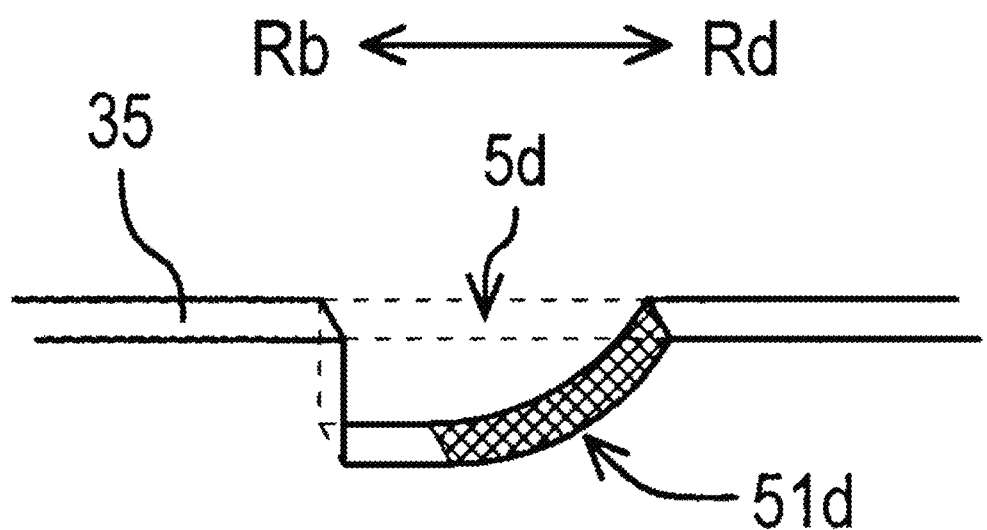
FIG. 4B is a perspective view showing a peripheral wall recess according to another configuration of the second example of an example embodiment of the present disclosure.

Next, with reference to FIGS. 4A and 4B, peripheral wall recesses 5c and 5d according to another configuration of the first and second example embodiments of the present disclosure will be described. FIG. 4A is a perspective view showing the peripheral wall recess 5c according to another configuration of the first example embodiment of the present disclosure. FIG. 4B is a perspective view showing the peripheral wall recess 5d according to another configuration of the second example embodiment of the present disclosure. In FIGS. 4A and 4B, the moving blade 11 and the peripheral wall recesses 5c and 5d are viewed from the radial direction and from above.

In the peripheral wall recesses 5c and 5d according to other configurations of the first and second example embodiments of the present disclosure, the other circumferential side surface facing in the rotation direction Rd is a flat surface substantially parallel to the axial direction as viewed from the radial direction as shown in FIGS. 4A and 4B. Noise generated around first peripheral surfaces 51c and 51d of the peripheral wall recesses 5c and 5d is larger than noise generated around the other circumferential side surfaces of the peripheral wall recesses 5c and 5d. Therefore, even if only the first peripheral surfaces 51c and 51d are provided in the peripheral wall recesses 5c and 5d, the generation of noise due to airflows flowing into the peripheral wall recesses 5c and 5d can be suppressed or minimized.

In FIGS. 4A and 4B, the first peripheral surfaces 51c and 51d are each an example of the "first peripheral surface" of the present disclosure.

Next, peripheral wall recesses 5e and 5f according to a first modified example of the first and second example embodiments of the present disclosure will be described. In the first modified example, description is given of a configuration different from the peripheral wall recesses 5a, 5b, 5c, and 5d according to the first and second example embodiments of the present disclosure described above. The same constituents as the peripheral wall recesses 5a to 5d according to the first and second example embodiments are denoted by the same reference numerals, and descriptions thereof are omitted for the sake of brevity.

Figure 5A:
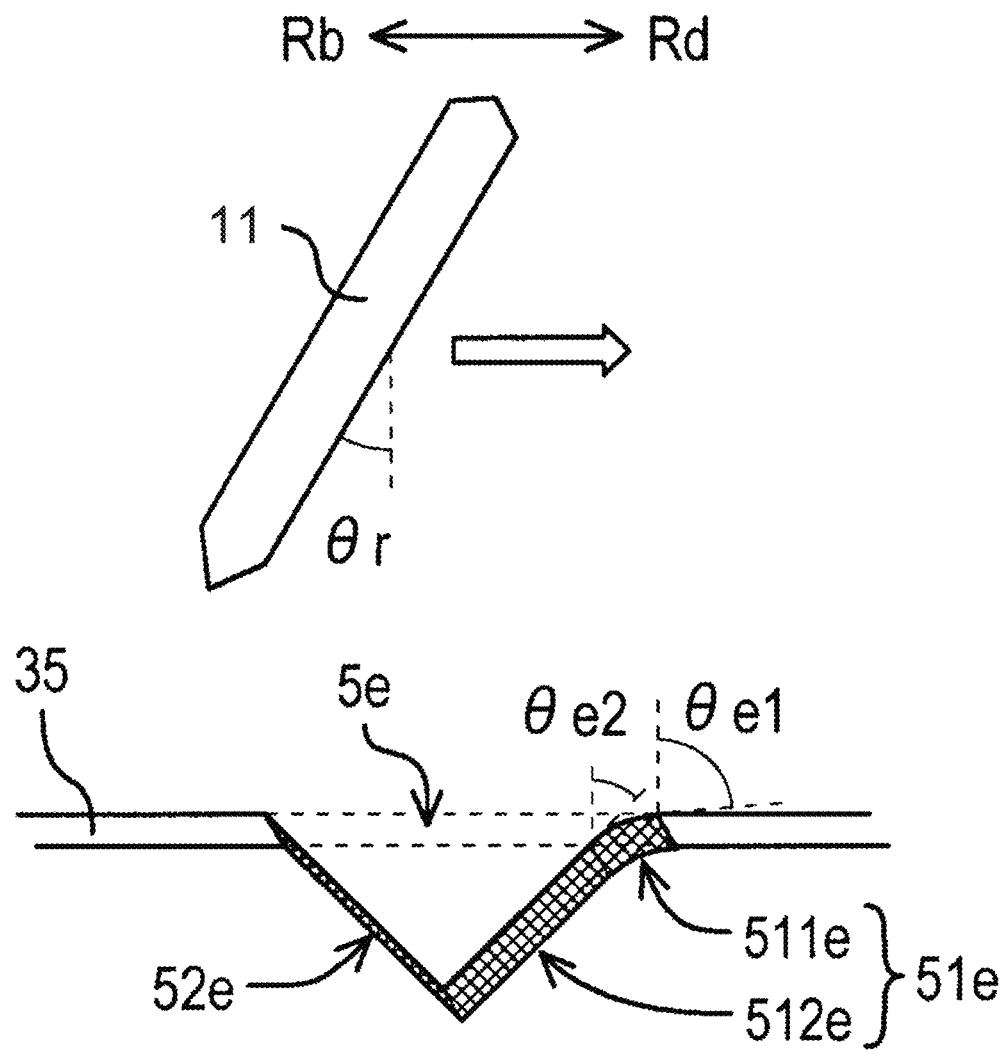
FIG. 5A is a perspective view showing a peripheral wall recess according to a first modified example of the first example embodiment of the present disclosure.
Figure 5B:
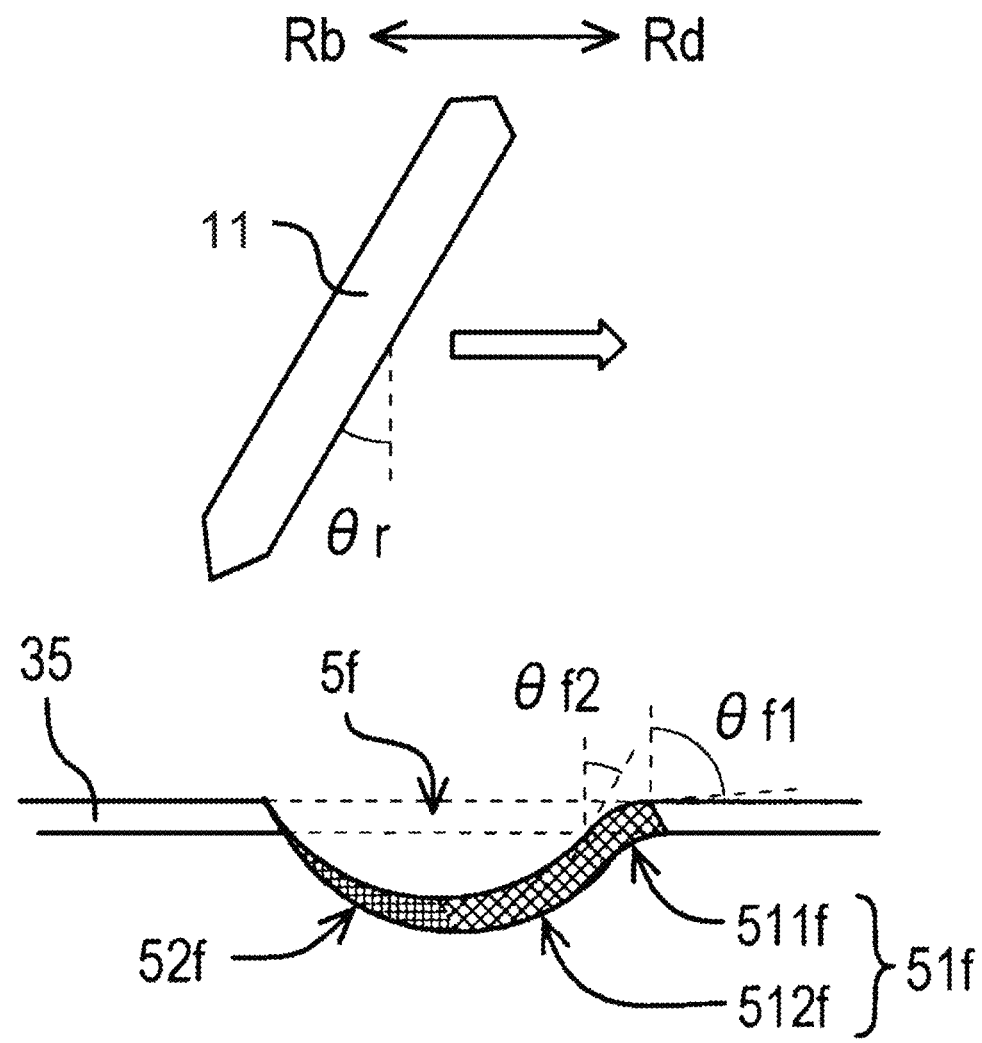
FIG. 5B is a perspective view showing a peripheral wall recess according to a first modified example of the second example embodiment of the present disclosure.

FIG. 5A is a perspective view showing the peripheral wall recess 5e according to the first modified example of the first example embodiment of the present disclosure. FIG. 5B is a perspective view showing the peripheral wall recess 5f according to the first modified example of the second example embodiment of the present disclosure. In FIGS. 5A and 5B, the moving blade 11 and the peripheral wall recesses 5e and 5f are viewed from the radial direction and from above.

As shown in FIGS. 5A and 5B, in the first modified example of the first and second example embodiments, first peripheral surfaces 51e and 51f include first region surfaces 511e and 511f extending from the upper ends of the peripheral wall recesses 5e and 5f and second region surfaces 512e and 512f extending from lower ends of the first region surfaces 511e and 511f. The first region surfaces 511e and 511f are curved surfaces that are curved upward as viewed from the radial direction and toward one circumferential direction Rb. The first tilt direction of the first region surfaces 511e and 511f is perpendicular to the normal and radial directions of the first region surfaces 511e and 511f at the upper ends of the first region surfaces 511e and 511f. The second tilt direction of the second region surfaces 512e and 512f is perpendicular to the normal and radial directions of the second region surfaces 512e and 512f at the upper ends of the second region surfaces 512e and 512f. The first region surfaces 511e and 511f can be provided by scraping the corners formed by the first peripheral surfaces 51e and 51f and the upper surface of the peripheral wall portion 35. That is, the first region surfaces 511e and 511f can preferably be provided at the corners by performing so-called round chamfering on the corners.

In the first modified example of the first and second example embodiments, first acute angles $\theta e1$ and $\theta f1$ made by the first tilt directions of the first region surfaces 511e and 511f with the axial direction are preferably greater than second acute angles $\theta e2$ and $\theta f2$ made by the second tilt directions of the second region surfaces 512e and 512f with the axial direction. Since the first acute angles $\theta e1$ and $\theta f1$ of the first region surfaces 511e and 511f are greater than the second acute angles $\theta e2$ and $\theta f2$ of the second region surfaces 512e and 512f, it is made easier for airflows hitting against the first region surfaces 511e and 511f to flow more smoothly along the first region surfaces 511e and 511f. At least some of the airflows flowing along the first region surfaces 511e and 511f can be smoothly released to the upper surface of the peripheral wall portion 35. Accordingly, it is possible to further suppress or minimize the generation of noise due to the airflows flowing into the peripheral wall recesses 5e and 5f. However, the present disclosure is not limited to this example, and $\theta e1 \leq \theta e2$ or $\theta f1 \leq \theta f2$ may be satisfied if so desired.

The second acute angles $\theta e1$ and $\theta f1$ are preferably greater than the acute angle $\theta r$ made by the moving blade 11 with the axial direction. Since the second acute angles $\theta e2$ and $\theta f2$ of the second region surfaces 512e and 512f are greater than the acute angle $\theta r$ of the moving blade, it is made easier for airflows hitting against the second region surfaces 512e and 512f to flow more smoothly along the second region surfaces 512e and 512f. Therefore, it is possible to more effectively suppress or minimize the generation of noise due to the airflows flowing into the peripheral wall recesses 5e and 5f. However, the present disclosure is not limited to this example, and $\theta e \leq \theta r$ or $\theta f2 \leq \theta r$ may be satisfied if so desired.

As shown in FIG. 5A, in the first modified example of the first example embodiment of the present disclosure, the second region surface 512e extends, in other words, from one circumferential direction Rb to the other circumferential direction Rd toward the upper side from the lower end of the peripheral wall recess 5e. As described above, the first peripheral surface 51e includes the second region surface 512e. The second region surface 512e is a flat surface tilted in the other circumferential direction Rd toward the upper side. Since the second region surface 512e is the flat surface as described above, an opening area in the circumferential direction of the peripheral wall recess 5e as viewed from the radial direction can be increased while increasing the second acute angle $\theta e2$ of the second region surface 512e. Therefore, more airflows can be flowed radially inside of the peripheral wall portion 35 through the peripheral wall recess 5e to cool the stator 22 of the motor 2, the electronic component 41 mounted on the substrate 4, and the like.

As shown in FIG. 5B, in the first modified example of the second example embodiment of the present disclosure, the second region surface 512f extends, in other words, from one circumferential direction Rb to the other circumferential direction Rd toward the upper side from the lower end of the peripheral wall recess 5f. As described above, the first peripheral surface 51f includes the second region surface 512f. The second region surface 512f is preferably a curved surface that is curved downward as viewed from the radial direction and toward the other circumferential direction Rd. Since the second region surface 512f is the curved surface as described above, it is made easier to increase the acute angle made by the direction perpendicular to the normal and radial directions of the second region surface 512f with the axial direction in the entire second region surface 512f. Therefore, since the airflow hitting against the second region surface 512f more easily flows smoothly along the second region surface 512f, the generation of noise can be suppressed or minimized. The second region surface 512f is not limited to the example shown in FIG. 5B, but may be a curved surface that is curved upward as viewed from the radial direction and toward one circumferential direction Rb.

In FIGS. 5A and 5B, the second peripheral surfaces 52e and 52f of the peripheral wall recesses 5e and 5f are the other circumferential side surfaces extending from one circumferential direction Rb to the other circumferential direction Rd toward the lower side from the upper ends of the peripheral wall recesses 5e and 5f. However, the present disclosure is not limited to the examples shown in FIGS. 5A and 5B, but the other circumferential side surfaces facing in the rotation direction Rd of the peripheral wall recesses 5e and 5f do not have to extend from one circumferential direction Rb to the other circumferential direction Rd toward the lower side and may be flat surfaces substantially parallel to the axial direction as viewed from the radial direction as in the case of FIGS. 4A and 4B, for example.

The present disclosure is not limited to the examples shown in FIGS. 5A and 5B, but the corner portions formed by the second peripheral surfaces 52e and 52f and the upper surface of the peripheral wall portion 35 may preferably be subjected to so-called round chamfering or so-called C beveling to obliquely cut off the corners of the corner portions. Such chamfering of the corner portions makes it possible to further suppress or minimizes the generation of noise due to the airflows along the second peripheral surfaces 52e and 52f flowing into the peripheral wall recesses 5e and 5f.

In the first modified example of the first and second example embodiments of the present disclosure, the first peripheral surfaces 51e and 51f are each an example of the "first peripheral surface" of the present disclosure. The first region surfaces 511e and 511f are each an example of the "first surface" of the present disclosure. The second region surfaces 512e and 512f are each an example of the "second surface" of the present disclosure. The second peripheral surfaces 52e and 52f are each an example of the "second peripheral surface" of the present disclosure.

Next, peripheral wall recesses 5g and 5h according to a second modified example of the first and second example embodiments of the present disclosure will be described. In the second modified example, description is given of a configuration different from the peripheral wall recesses 5a to 5d according to the first and second example embodiments of the present disclosure described above and the peripheral wall recesses 5e and 5f according to the first modified example thereof. The same constituents as the peripheral wall recesses 5a to 5d according to the first and second example embodiments described above and the peripheral wall recesses 5e and 5f according to the first modified example thereof are denoted by the same reference numerals, and description thereof are omitted for brevity.

Figure 6A:
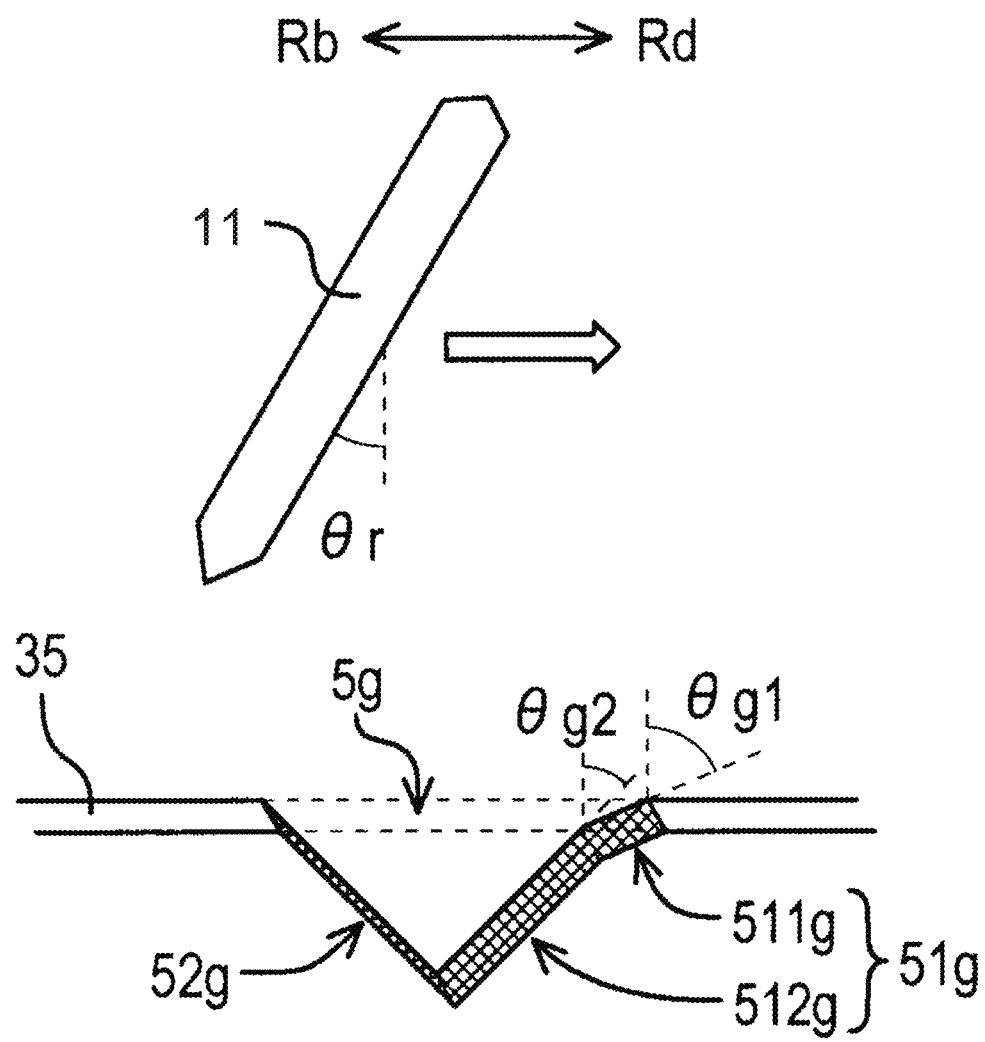
FIG. 6A is a perspective view showing a peripheral wall recess according to a second modified example of the first example embodiment of the present disclosure.
Figure 6B:
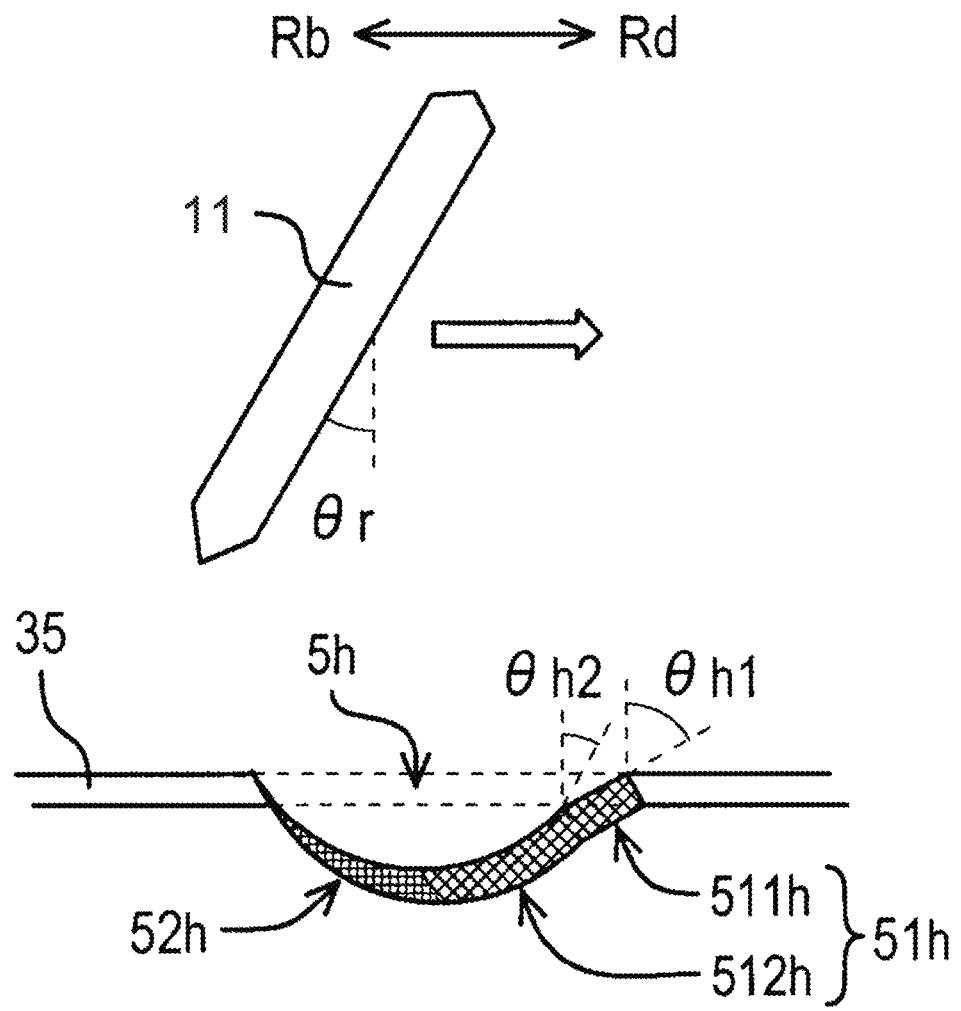
FIG. 6B is a perspective view showing a peripheral wall recess according to a second modified example of the second example embodiment of the present disclosure.

FIG. 6A is a perspective view showing the peripheral wall recess 5g according to the second modified example of the first example embodiment of the present disclosure. FIG. 6B is a perspective view showing the peripheral wall recess 5h according to the second modified example of the second example embodiment of the present disclosure. In FIGS. 6A and 6B, the moving blade 11 and the peripheral wall recesses 5g and 5h are viewed from the radial direction and from above.

As shown in FIGS. 6A and 6B, in the second modified example of the first and second example embodiments of the present disclosure, the first peripheral surfaces 51g and 51h include first region surfaces 511g and 511h extending downward from upper ends of the peripheral wall recesses 5g and 5h and second region surfaces 512g and 512h extending downward from lower ends of the first region surfaces 511g and 511h. The first region surfaces 511g and 511h are flat surfaces tilted from the other circumferential direction Rd to one circumferential direction Rb toward the lower side from the upper ends of the peripheral wall recesses 5g and 5h. A second tilt direction of the second region surfaces 512g and 512h is perpendicular to the normal and radial directions of the second region surfaces 512g and 512h at the upper ends of the second region surfaces 512g and 512h. The first region surfaces 511g and 511h can be provided by obliquely cutting off the corners of corner portions formed by the first peripheral surfaces 51g and 51h and the upper surface of the peripheral wall portion 35. That is, by providing the first peripheral surfaces 51g and 51h, so-called C beveling can preferably be performed on the corner portions.

In the second modified example of the first and second example embodiments of the present disclosure, first acute angles θg1 and θh1 made by the first region surfaces 511g and 511h with the axial direction are preferably greater than second acute angles θg2 and θh2 made by the second tilt direction of the second region surfaces 512g and 512h with the axial direction. Since the first acute angles θg1 and θh1 of the first region surfaces 511g and 511h are greater than the second acute angles θg2 and θh2 of the second region surfaces 512g and 512h, it is made easier for airflows hitting against the first region surfaces 511g and 511h to flow more smoothly along the first region surfaces 511g and 511h. At least some of the airflows flowing along the first region surfaces 511g and 511h can be smoothly released to the upper surface of the peripheral wall portion 35. Therefore, it is possible to further suppress or minimize the generation of noise due to the airflows flowing into the peripheral wall recesses 5g and 5h. However, the present disclosure is not limited to this example, and θg1≤θg2 or θh1≤θh2 may be satisfied if so desired.

The second acute angles θg2 and θh2 are preferably greater than the acute angle θr made by the moving blade 11 with the axial direction. Since the second acute angles θg2 and θh2 of the second region surfaces 512g and 512h are greater than the acute angle θr of the moving blade 11, it is made easier for the airflows hitting against the second region surfaces 512g and 512h to flow more smoothly along the second region surfaces 512g and 512h. Therefore, it is possible to more effectively suppress or minimize the generation of noise due to the airflows flowing into the peripheral wall recesses 5g and 5h. However, the present disclosure is not limited to this example, and θg2≤θr or θh2≤θr may be satisfied if so desired.

In the second modified example of the first example embodiment of the present disclosure, as shown in FIG. 6A, the second region surface 512g is a flat surface tilted to the other circumferential direction Rd toward the upper side from the lower end of the peripheral wall recess 5g. In the second modified example of the second example embodiment of the present disclosure, the second region surface 512h is a curved surface extending from one circumferential direction Rb to the other circumferential direction Rd toward the upper side from the lower end of the peripheral wall recess 5h. As shown in FIG. 6B, the curved surface is preferably curved downward as viewed from the radial direction and toward the other circumferential direction Rd. However, the second region surface 512h is not limited to this example, but may be a curved surface that is curved upward as viewed from the radial direction and toward one circumferential direction Rb if so desired.

In FIGS. 6A and 6B, the second peripheral surfaces 52g and 52h of the peripheral wall recesses 5g and 5h are the other circumferential side surfaces extending from one circumferential direction Rb to the other circumferential direction Rd toward the lower side from the upper ends of the peripheral wall recesses 5g and 5h. However, the present disclosure is not limited to the examples shown in FIGS. 6A and 6B, and the other circumferential side surfaces of the peripheral wall recesses 5g and 5h facing the rotation direction Rd do not have to extend from one circumferential direction Rb to the other circumferential direction Rd toward the lower side, but may be flat surfaces substantially parallel to the axial direction as viewed from the radial direction, as in the case of FIGS. 4A and 4B, for example.

The present disclosure is not limited to the examples shown in FIGS. 6A and 6B, but the corner portions formed by the second peripheral surfaces 52g and 52h and the upper surface of the peripheral wall portion 35 may preferably be subjected to so-called round chamfering or so-called C beveling. Such chamfering of the corner portions makes it possible to further suppress or minimize the generation of noise due to the airflows along the second peripheral surfaces 52g and 52h flowing into the peripheral wall recess 5.

In the second modified example of the first and second example embodiments of the present disclosure, the first peripheral surfaces 51g and 51h are each an example of the "first peripheral surface" of the present disclosure. The first region surfaces 511g and 511h are each an example of the "first surface" of the present disclosure. The second region surfaces 512g and 512h are each an example of the "second surface" of the present disclosure. The second peripheral surfaces 52g and 52h are each an example of the "second peripheral surface" of the present disclosure.

Next, peripheral wall recesses 5i and 5j according to a third modified example will be described. In the third modified example, description is given of a configuration different from the peripheral wall recesses 5a to 5d according to the first and second example embodiments of the present disclosure described above and the peripheral wall recesses 5e to 5h according to the first and second modified examples. The same constituents as the peripheral wall recesses 5a to 5d according to the first and second examples described above and as the peripheral wall recesses 5e to 5h according to the first and second modified examples may be denoted by the same reference numerals, and description thereof are omitted for brevity.

Figure 7A:
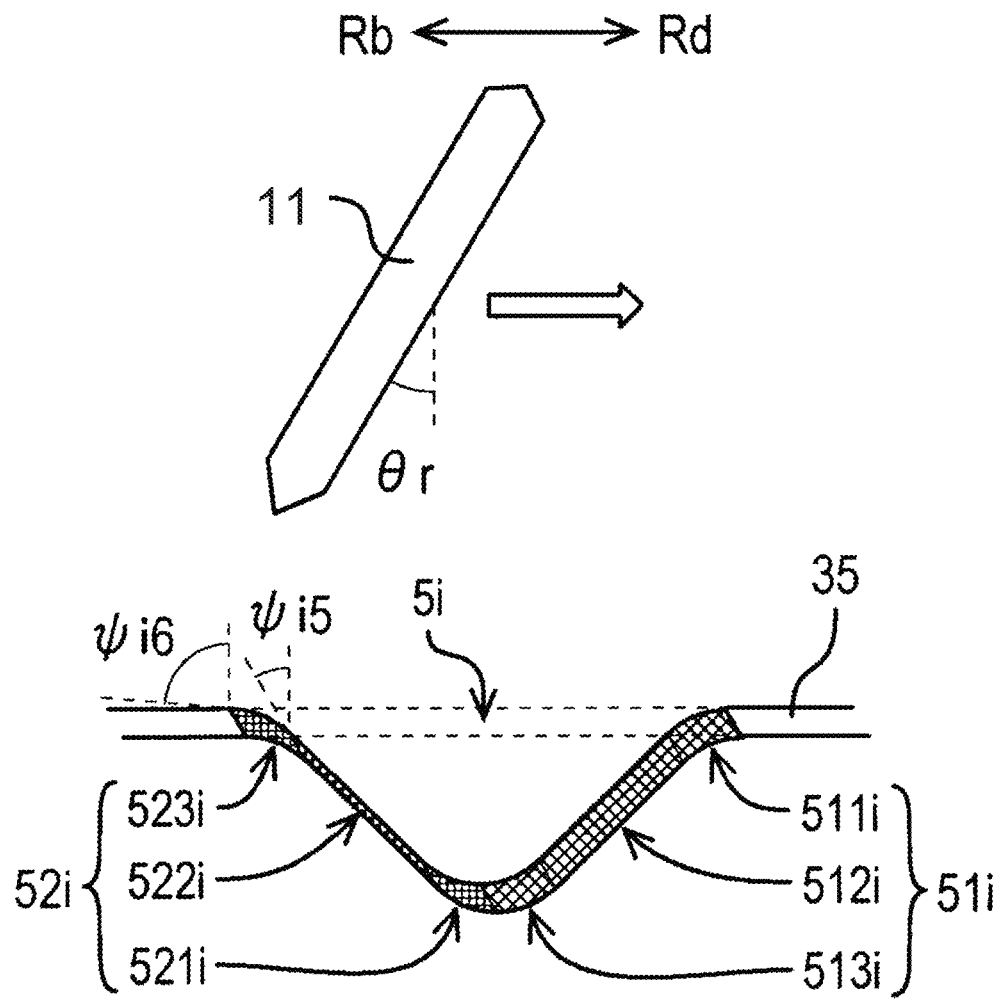
FIG. 7A is a perspective view showing a peripheral wall recess according to a third modified example of the first example embodiment of the present disclosure.
Figure 7B:
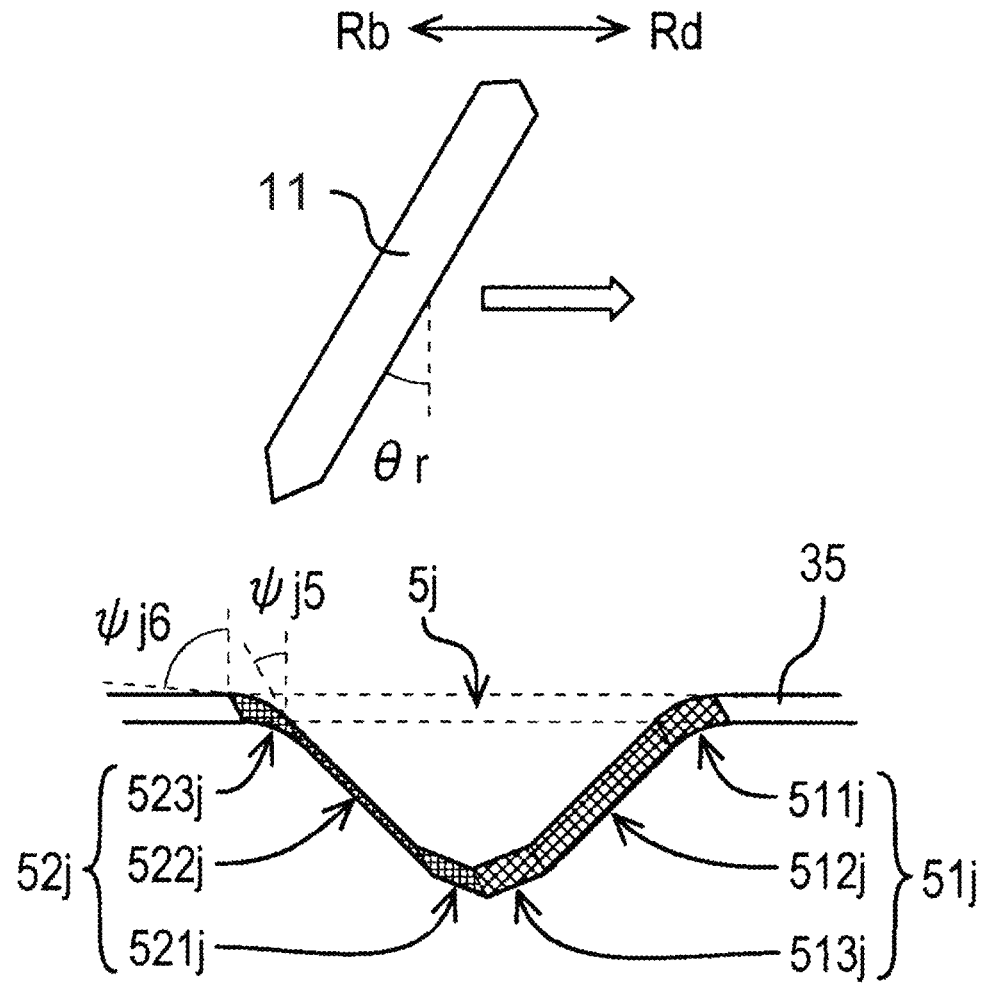
FIG. 7B is a perspective view showing a peripheral wall recess according to another configuration of the third modified example of the first example embodiment of the present disclosure.

FIG. 7A is a perspective view showing the peripheral wall recess 5i according to the third modified example of the first example embodiment of the present disclosure. FIG. 7B is a perspective view showing the peripheral wall recess 5j according to another configuration of the third modified example of the first example embodiment of the present disclosure. In FIGS. 7A and 7B, the moving blade 11 and the peripheral wall recesses 5i and 5j are viewed from the radial direction and from above.

As shown in FIGS. 7A and 7B, in the third modified example, the first peripheral surfaces 51i and 51j of the peripheral wall recesses 5i and 5j further include third region surfaces 513i and 513j, in addition to the first region surfaces 511i and 511j and the second region surfaces 512i and 512j. The third region surfaces 513i and 513j extend from one circumferential direction Rb to the other circumferential direction Rd toward the upper side from lower ends of the peripheral wall recesses 5i and 5j. The third region surfaces 513i and 513j have their upper ends connected to the lower ends of the second region surfaces 512i and 512j.

As shown in FIG. 7A, the third region surface 513i may be a curved surface that is curved downward as viewed from the radial direction and toward the other circumferential direction Rd. Since the third region surface 513i is such a curved surface, it is made easier to increase the acute angle made by the direction perpendicular to the normal and radial directions of the third region surface 513i with the axial direction in the entire third region surface 513i. Accordingly, since the airflow hitting against the third region surface 513i easily flows smoothly along the third region surface 513i, the generation of noise can be suppressed or minimized.

Alternatively, as shown in FIG. 7B, the third region surface 513i may be a flat surface tilted in the other circumferential direction Rd toward the upper side. Since the third region surface 513i is the flat surface as described above, an opening area in the circumferential direction of the peripheral wall recess 5i as viewed from the radial direction can be increased while increasing the acute angle made by the third region surface 513i with the axial direction. Therefore, more airflows can be flowed radially inside of the peripheral wall portion 35 through the peripheral wall recess 5i to cool the stator 22 of the motor 2, the electronic component 41 mounted on the substrate 4, and the like.

As shown in FIGS. 7A and 7B, in the third modified example of the peripheral wall recesses 5i and 5j, the second peripheral surfaces 52i and 52j include fourth region surfaces 521i and 521j extending from the lower ends of the peripheral wall recesses 5i and 5j. As shown in FIG. 7A, the fourth region surface 521i may be a curved surface that is curved downward as viewed from the radial direction and from the other circumferential direction Rd to one circumferential direction Rb. Since the fourth region surface 521i is such a curved surface, it is made easier to increase the acute angle made by the direction perpendicular to the normal and radial directions of the fourth region surface 521i with the axial direction in the entire fourth region surface 521i. Therefore, since the airflow easily flows smoothly along the fourth region surface 521i, the generation of noise can be suppressed or minimized.

Alternatively, as shown in FIG. 7B, the fourth region surface 521j may be a flat surface tilted in one circumferential direction Rb toward the upper side. Since the fourth region surface 521j is the flat surface as described above, an opening area in the circumferential direction of the peripheral wall recesses 5i and 5j as viewed from the radial direction can be further increased while increasing the acute angle made by the fourth region surface 521j with the axial direction. Therefore, more airflows can be flowed radially inside of the peripheral wall portion 35 through the peripheral wall recess 5i and 5j to cool the stator 22 of the motor 2, the electronic component 41 mounted on the substrate 4, and the like.

The second peripheral surfaces 52i and 52j further include fifth region surfaces 522i and 522j and sixth region surfaces 523i and 523j.

The fifth region surfaces 522i and 522j have their lower ends connected to the upper ends of the fourth region surfaces 521i and 521j. The fifth region surfaces 522i and 522j have their upper ends connected to the lower ends of the sixth region surfaces 523i and 523j. In FIG. 7A and FIG. 7B, the fifth region surfaces 522i and 522j are flat surfaces tilted in one circumferential direction Rb toward the upper side from the upper ends of the fourth region surfaces 521i and 521j as viewed from the radial direction. However, the fifth region surfaces 522i and 522j are not limited to the examples illustrated in FIGS. 7A and 7B, but may be curved surfaces that are curved downward and toward one circumferential direction Rb or a curved surface that is curved upward and toward the other circumferential direction Rd as viewed from the radial direction. The tilt directions of the fifth region surfaces 522i and 522j are perpendicular to the normal and radial directions of the fifth region surfaces 522i and 522j at the upper ends of the fifth region surfaces 522i and 522j.

The sixth region surfaces 523i and 523j extend from the upper ends of the peripheral wall recesses 5i and 5j. The sixth region surfaces 523i and 523j are curved surfaces that are curved upward as viewed from the radial direction and toward the other circumferential direction Rd. The tilt directions of the sixth region surfaces 523i and 523j are perpendicular to the normal and radial directions of the sixth region surfaces 523i and 523j at the upper ends of the sixth region surfaces 523i and 523j. The sixth region surfaces 523i and 523j can preferably be provided by cutting off the corners of corner portions formed by the second peripheral surfaces 52i and 52j and the upper surface of the peripheral wall portion 35. More specifically, the sixth region surfaces 523i and 523j can be provided at the corner portions by performing so-called round chamfering on the corner portions. The tilt directions of the sixth region surfaces 523i and 523j are perpendicular to the normal and radial directions of the sixth region surfaces 523i and 523j at the upper ends of the sixth region surfaces 523i and 523j.

The sixth region surfaces 523i and 523j are not limited to the examples shown in FIGS. 7A and 7B, but may be flat surfaces tilted from one circumferential direction Rb to the other circumferential direction Rd toward the lower side from the upper ends of the peripheral wall recesses 5i and 5j. In this case, the sixth region surfaces 523i and 523j can be provided by obliquely cutting off the corners of the corner portions formed by the second peripheral surfaces 52i and 52j and the upper surface of the peripheral wall portion 35. More specifically, by providing the sixth region surfaces 523i and 523j, the corner portions can preferably be subjected to so-called C beveling.

Next, acute angles φi5 and φj5 made by the tilt directions of the fifth region surfaces 522i, 522j with the axial direction and acute angles φi6 and φj6 made by the tilt directions of the sixth region surfaces 523i and 523j at the upper ends of the sixth region surfaces 523i and 523j with the axial direction are preferably greater than the acute angle θr made by the moving blade 11 with the axial direction. Since the acute angles φi5 and φj5 of the fifth region surfaces 522i and 522j and the acute angles φi6 and φj6 of the sixth region surfaces 523i and 523j are greater than the acute angle θr of the moving blade 11, it is made easier for the airflows to flow more smoothly along the fifth region surfaces 522i and 522j and the sixth region surfaces 523i and 523j. Therefore, it is possible to more effectively suppress or minimize the generation of noise due to the airflows flowing into the peripheral wall recesses 5i and 5j. However, the present disclosure is not limited to this example, and the acute angles φi5 and φj5 and the acute angles φi6 and φj6 may be equal to or smaller than the acute angle θr made by the moving blade 11 with the axial direction.

In the third modified example of the peripheral wall recesses 5i and 5j, the first peripheral surfaces 51i and 51j are each an example of the "first peripheral surface" of the present disclosure. The first region surfaces 511i and 511j are each an example of the "first surface" of the present disclosure. The second region surfaces 512i and 512j are each an example of the "second surface" of the present disclosure. The third region surfaces 513i and 513j are each an example of the "third surface" of the present disclosure. The second peripheral surfaces 52i and 52j are each an example of the "second peripheral surface" of the present disclosure. The fourth region surfaces 521i and 521j are each an example of the "fourth surface" of the present disclosure.

Example embodiments of the present disclosure have been described above. The scope of the present disclosure is not limited to the example embodiments described above. The present disclosure can be implemented by making various changes to the example embodiments described above without departing from the spirit of the disclosure. The matters described in the above example embodiments can be appropriately combined without causing any contradiction.

The present disclosure is useful for a blower, for example, having a recess provided in a peripheral wall portion of a housing.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A blower, comprising:
a moving blade rotatable about a central axis extending in a vertical direction;
a motor to rotate the moving blade;
a housing surrounding the moving blade and the motor; and
a substrate; wherein
the housing includes a holding portion below the moving blade to hold the motor, and a peripheral wall portion having a cylindrical shape centered on the central axis and extending upward from a radially outer end portion of the holding portion;
the peripheral wall portion includes a peripheral wall recess recessed downward from an upper end of the peripheral wall portion and connecting a space radially inside of the peripheral wall portion and a space radially outside of the peripheral wall portion;
the peripheral wall recess includes a first peripheral surface that faces one circumferential direction that is opposite to a rotation direction of the moving blade, the first peripheral surface extending in the one circumferential direction from an upper end of the peripheral wall recess toward a lower side;
the substrate is radially inside of the peripheral wall portion;
the substrate opposes the peripheral wall recess in a radial direction;
a tilt direction of the first peripheral surface is a direction perpendicular or substantially perpendicular to normal and radial directions of the first peripheral surface; and
an acute angle defined by the tilt direction of the first peripheral surface with an axial direction is greater than an acute angle defined by the moving blade with the axial direction.

2. The blower according to claim 1, wherein
a bottom portion of the peripheral wall recess is lower than a top surface of the substrate in an axial direction.

3. The blower according to claim 1, wherein
the upper end of the peripheral wall portion is provided at a same axial height around a majority of a circumference of the peripheral wall portion.

4. The blower according to claim 1, wherein
the peripheral wall portion includes a plurality of the peripheral wall recesses which are separated by circumferentially extending flat upper portions of the peripheral wall portion.

5. The blower according to claim 1, wherein
the peripheral wall recess further includes a second peripheral surface facing in another circumferential direction that is the same direction as the rotation direction of the moving blade; and
the second peripheral surface extends from the one circumferential direction to the another circumferential direction toward the lower side from the upper end of the peripheral wall recess.

6. The blower according to claim 5, wherein
the second peripheral surface includes a fourth surface extending from the lower side of the peripheral wall recess; and
the fourth surface is one of a curved surface that is curved downward and from the another circumferential direction to the one circumferential direction as viewed from the radial direction and a flat surface that is tilted in the one circumferential direction toward the upper end.

7. A blower, comprising:
a moving blade rotatable about a central axis extending in a vertical direction;
a motor to rotate the moving blade;
a housing surrounding the moving blade and the motor; and
a substrate; wherein
the housing includes a holding portion below the moving blade to hold the motor, and a peripheral wall portion having a cylindrical shape centered on the central axis and extending upward from a radially outer end portion of the holding portion;
the peripheral wall portion includes a peripheral wall recess recessed downward from an upper end of the peripheral wall portion and connecting a space radially inside of the peripheral wall portion and a space radially outside of the peripheral wall portion;
the peripheral wall recess includes a first peripheral surface that faces one circumferential direction that is opposite to a rotation direction of the moving blade, the first peripheral surface extending in the one circumferential direction from an upper end of the peripheral wall recess toward a lower side;
the substrate is radially inside of the peripheral wall portion;
the substrate opposes the peripheral wall recess in a radial direction;
the first peripheral surface includes a first surface extending from the upper end of the peripheral wall recess and a second surface extending from a lower end of the first surface;
the first surface is curved upward and toward the one circumferential direction as viewed from the radial direction, and a first tilt direction of the first surface is perpendicular to normal and radial directions of the first surface at an upper end of the first surface;
a second tilt direction of the second surface is perpendicular or substantially perpendicular to normal and radial directions of the second surface at an upper end of the second surface; and
a first acute angle defined by the first tilt direction with an axial direction is greater than a second acute angle defined by the second tilt direction with the axial direction.

8. The blower according to claim 7, wherein the second acute angle is greater than an acute angle defined by the moving blade with the axial direction.

9. The blower according to claim 7, wherein
the first peripheral surface includes a third surface extending from the one circumferential direction to another circumferential direction toward the upper end of the peripheral wall portion from a lower end of the peripheral wall recess;
the third surface includes an upper end connected to a lower end of the second surface; and
the third surface is one of a curved surface that is curved downward as viewed from the radial direction and toward the another circumferential direction and a flat surface that is tilted to the another circumferential direction toward the upper end of the peripheral wall portion.

10. A blower, comprising:
a moving blade rotatable about a central axis extending in a vertical direction;
a motor to rotate the moving blade;
a housing surrounding the moving blade and the motor; and
a substrate; wherein
the housing includes a holding portion below the moving blade to hold the motor, and a peripheral wall portion having a cylindrical shape centered on the central axis and extending upward from a radially outer end portion of the holding portion;
the peripheral wall portion includes a peripheral wall recess recessed downward from an upper end of the peripheral wall portion and connecting a space radially inside of the peripheral wall portion and a space radially outside of the peripheral wall portion;
the peripheral wall recess includes a first peripheral surface that faces one circumferential direction that is opposite to a rotation direction of the moving blade, the first peripheral surface extending in the one circumferential direction from an upper end of the peripheral wall recess toward a lower side;
the substrate is radially inside of the peripheral wall portion;
the substrate opposes the peripheral wall recess in a radial direction;
the first peripheral surface includes a first surface extending downward from the upper end of the peripheral wall recess, and a second surface extending downward from a lower end of the first surface;
the first surface is a flat surface tilted from another circumferential direction to the one circumferential direction toward the lower side from the upper end of the peripheral wall recess;
a second tilt direction of the second surface is perpendicular to normal and radial directions of the second surface at an upper end of the second surface; and
a first acute angle defined by the first surface with an axial direction is greater than a second acute angle defined by the second tilt direction with the axial direction.

11. The blower according to claim 10, wherein the second acute angle is greater than an acute angle defined by the moving blade with the axial direction.

* * * * *